United States Patent
Vallepalli et al.

(10) Patent No.: US 12,063,169 B2
(45) Date of Patent: Aug. 13, 2024

(54) MULTISITE INTERCONNECT AND POLICY WITH SWITCHING FABRICS

(71) Applicant: Cisco Technology, Inc., San Jose, CA (US)

(72) Inventors: Sridhar Vallepalli, Fremont, CA (US); Javed Asghar, Dublin, CA (US); Umamaheswararao Karyampudi, Fremont, CA (US); Saad Malik, Milpitas, CA (US); Amitkumar V. Patel, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/464,783

(22) Filed: Sep. 11, 2023

(65) Prior Publication Data
US 2024/0048509 A1 Feb. 8, 2024

Related U.S. Application Data

(63) Continuation of application No. 17/447,773, filed on Sep. 15, 2021, now Pat. No. 11,757,793, which is a (Continued)

(51) Int. Cl.
| | |
|---|---|
| *H04L 49/15* | (2022.01) |
| *H04L 45/00* | (2022.01) |
| *H04L 45/02* | (2022.01) |
| *H04L 45/745* | (2022.01) |
| *H04L 47/20* | (2022.01) |

(Continued)

(52) U.S. Cl.
CPC .......... *H04L 49/1507* (2013.01); *H04L 45/04* (2013.01); *H04L 45/22* (2013.01); *H04L 45/72* (2013.01); *H04L 45/745* (2013.01); *H04L 47/20* (2013.01); *H04L 67/563* (2022.05); *H04L 12/66* (2013.01)

(58) Field of Classification Search
CPC ....... H04L 67/563; H04L 45/05; H04L 45/22; H04L 45/72; H04L 45/745; H04L 47/20; H04L 12/66; H04L 49/1507
See application file for complete search history.

(56) References Cited

U.S. PATENT DOCUMENTS

| | | | |
|---|---|---|---|
| 2015/0263952 A1* | 9/2015 | Ganichev | ............ H04L 41/0813 370/389 |
| 2018/0145945 A1* | 5/2018 | Gupta Hyde | ........... H04L 43/12 |

* cited by examiner

*Primary Examiner* — Samina F Choudhry
(74) *Attorney, Agent, or Firm* — Patterson + Sheridan, LLP (57) ABSTRACT

Embodiments herein describe using translation mappings and security contracts to establish interconnects and policies between switching fabrics at different sites to create a unified fabric. In one embodiment, a multi-site controller can stretch endpoint groups (EPGs) between the sites so that a host or application in a first site can communicate with a host or application in a second site which is assigned to the same stretched EPG, despite the two sites have different namespaces. Further, the shadow EPGs can be formed to facilitate security contracts between EPGs in different sites. Each site can store namespace translation mapping that enable the site to convert namespace information in packets received from a different site into its own namespace values. As a result, independent bridging and routing segments in the various sites can be interconnected as well as providing application accessibility across different fabrics with independent and private namespaces.

25 Claims, 8 Drawing Sheets

Related U.S. Application Data continuation of application No. 16/164,607, filed on Oct. 18, 2018, now Pat. No. 11,178,071.

(60) Provisional application No. 62/694,384, filed on Jul. 5, 2018.

(51) Int. Cl.
*H04L 67/563* (2022.01)
*H04L 12/66* (2006.01)

MULTISITE INTERCONNECT AND POLICY WITH SWITCHING FABRICS

CROSS-REFERENCE TO RELATED APPLICATIONS

This application is a continuation of co-pending U.S. patent application Ser. No. 17/447,773, filed Sep. 15, 2021, which claims benefit to U.S. patent application Ser. No. 16/164,607, filed Oct. 18, 2018, which issued on Nov. 16, 2021 as U.S. Pat. No. 11,178,071, which claims benefit of U.S. provisional patent application Ser. No. 62/694,384, filed Jul. 5, 2018. The aforementioned related patent applications are herein incorporated by reference in their entirety.

TECHNICAL FIELD

Embodiments presented in this disclosure generally relate to creating a unified fabric using switching fabrics disposed at multiple sites.

BACKGROUND

Datacenter fabrics can be deployed with a local-site controller managing a set of switches using various types of architectures. This single instance of a fabric (and the hosts and applications coupled to the fabrics) is referred herein as a site. However, the size of the site (e.g., the number of switches in the site) is often limited by the capacity of the network domains in the site as well as the risk that the site is a single point of failure. Today datacenter administrators create multiple sites which each have independent switching fabrics to enlarge capacity and provide redundancy to avoid a single point of failure. While doing so helps to mitigate these issues, creating independent sites does not provide uniform network connectivity and policy across such fabrics. As a result, the sites cannot be managed as a whole but must be individually configured and maintained.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a unified fabric. The unified fabric includes a first switching fabric at a first site and a second switching fabric at a second site where the first site is at a different geographic location than the second site and where the first switching fabric and the second switching fabric are communicatively coupled via a public network. The first switching fabric is configured to receive a packet from a first host at the first site, the packet comprising (i) a destination of a second host at the second site and (ii) a first source identifier value for a first endpoint group (EPG) as defined by a namespace of the first site, wherein the first host is assigned to the first EPG. The second switching fabric is configured to receive the packet via the public network from the first switching fabric and forward the packet to the second host after the first source identifier value in the packet is translated to a second source identifier value for a second EPG as defined by a namespace of the second site.

Another embodiment presented in this disclosure is a method that includes receiving, from a first switching fabric at a first site, a packet at a second switching fabric at a second site, wherein the packet comprises (i) a destination of a second host coupled to the second switching fabric at the second site and (ii) a first source identifier for a first EPG as defined by a namespace of the first site, wherein the first host is assigned to the first EPG, translating the first source identifier in the packet to a second source identifier for a second EPG as defined by a namespace of the second site, and forwarding the packet to the second host, wherein the packet contains the second source identifier.

Another embodiment presented in this disclosure is a system that includes a first local-site controller configured to manage a first switching fabric at a first site, a second local-site controller configured to manage a second switching fabric at a second site, and a multi-site controller communicatively coupled to the first and second local-site controllers. The multi-site controller is configured to receive a respective namespace from the first and second local-site controllers, the respective namespaces indicating source identifiers used to name EPGs in the first and second switching fabrics. The multi-site controller is also configured to generate respective namespace translation mappings for the first and second sites where the respective namespace translation mappings comprise information for translating source identifiers in packets transmitted between the first and second sites from a first value defined by the respective namespace of one of the first and second sites to a second value defined by the respective namespace of the other site.

Example Embodiments

Embodiments herein describe using translation mappings and security contracts to establish interconnects and policies between switching fabrics at different sites to create a unified fabric. In one embodiment, a multi-site controller can stretch endpoint groups (EPGs) between the sites so that a host or application in a first site can communicate with a host or application in a second site which is assigned to the same stretched EPG, despite the two sites have different namespaces (e.g., different values for Virtual Routing and Forwarding (VRF) instances, Bridge Domains (BD), subnets, or EPGs). Each site can store namespace translation mappings that enable the site to convert namespace information in packets received from a different site into its own namespace values. As a result, independent bridging and routing segments in the various sites can be interconnected as well as providing application accessibility (by using the EPGs) across different fabrics that have independent and private namespaces.

Additionally, the multi-site controller can establish shadow EPGs to facilitate security contracts and access policies between EPGs at different sites. For example, a security contract (or security policy) may indicate that hosts or applications assigned to a Web-EPG in a first site can communicate with hosts or applications assigned to an Application-EPG (i.e., an App-EPG) in a second site. To facilitate this policy, the multi-site controller generates a shadow Web-EPG in the second site so that packets transmitted by hosts in the first site are first translated to the shadow Web-EPG in the second site before being routed to a host or application assigned to the App-EPG. Doing so enables the multi-site controller to enforce security policies across independent fabrics.

Although the unified fabric includes multiple independent fabrics disposed at different sites, the embodiments herein enable the multi-site controller to present a unified view of the fabrics to the system administrator. For example, the administrator can use a single API or GUI to establish security policies and perform workload deployment across the different fabrics. As a result, the administrator avoids having to individually configure or provision the separate sites and can control the flow of data between the sites using only the API and GUI.

Figure 1:
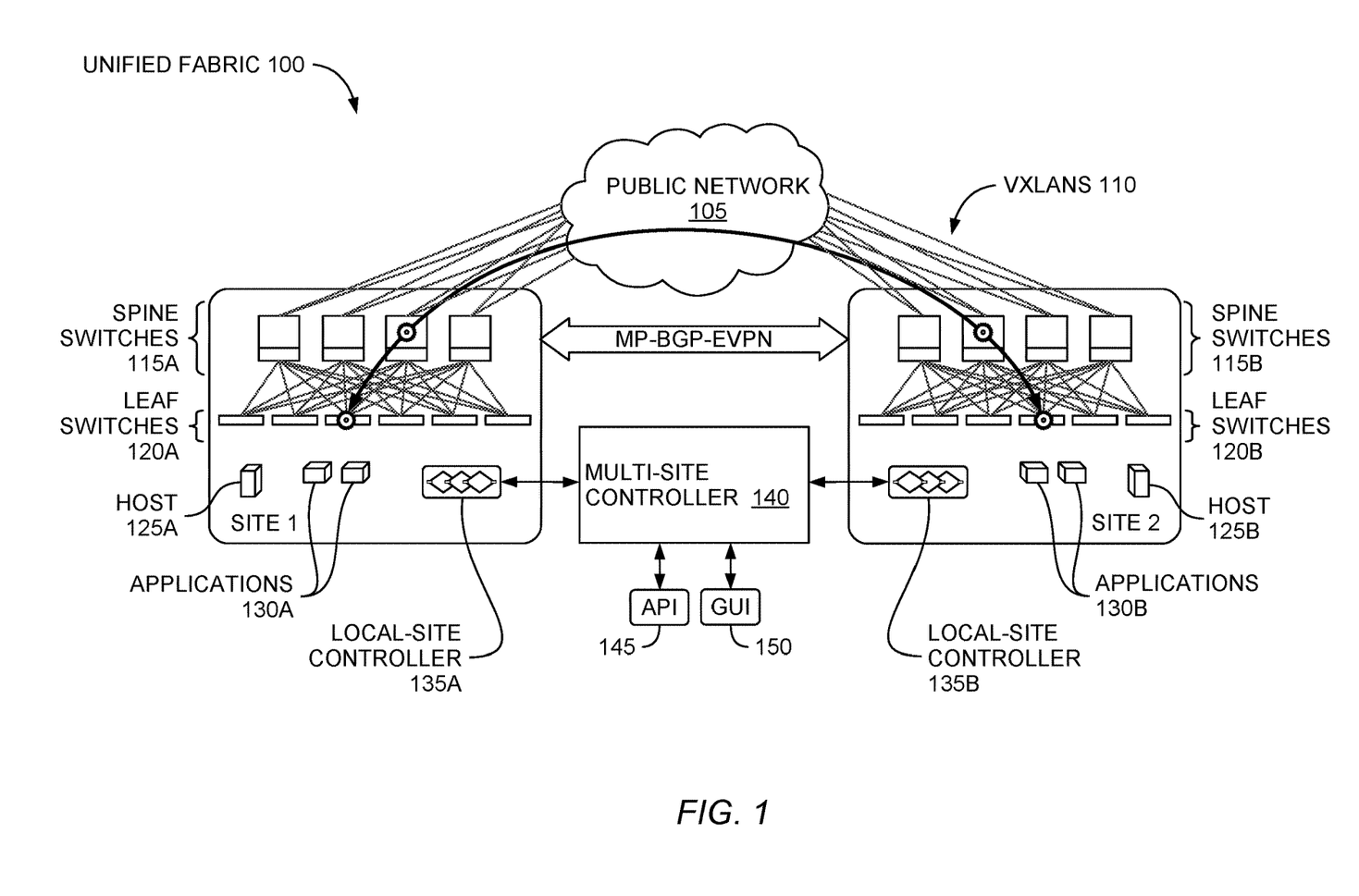
FIG. 1 illustrates a unified fabric including multiple sites, according to one embodiment described herein.

FIG. 1 illustrates a unified fabric 100 including multiple sites, according to one embodiment described herein. As shown, the fabric 100 includes Site 1 and Site 2 which each have respective switching fabrics formed by spine switches 115 and leaf switches 120. In this example, the leaf switches 120 are communicatively coupled to hosts 125 and applications 130. That is, the hosts 125 and applications 130 use the spine and leaf switches 115, 120 to communicate with other hosts and applications in the same site, hosts and applications in different sites, and entities that are outside of the fabric 100. In one embodiment, the hosts 125 and applications 130 are assigned to an EPG which permits these hosts 125 and applications 130 to communicate with each other. Put differently, the EPG assignments can be used to control traffic flow and provide security between the different hosts 125 and applications 130. For example, the host 125A may be unable to communicate with the applications 130A unless these entities are in the same EPG or there is a security policy (also referred to herein as a security contract) that permits the EGPs to which the host 125A and applications 130A are assigned to communicate. As such, the EPGs can be any kind of grouping of endpoints that controls the manner in which the hosts 125 and applications 130 can communicate with each other. In one embodiment, EPGs (which can also be referred to as security groups) are a collection of similar endpoints representing an application tier or set of services. The endpoints can include the hosts 125 and applications 130 as well as virtual machines, hypervisors, containers, physical servers, etc. Many different types endpoints can be assigned to the same EPG to perform a common service. In one embodiment, different policies are assigned to different EPGs in the fabric 100. For example, depending on which EPG an endpoint is assigned can determine the security policy, Quality of Service (QoS), service chain policy, and routing policy for that endpoint.

While FIG. 1 illustrates using a spine-leaf architecture to form the individual fabrics in the sites, this is not a requirement. The switches can be organized in any arrangement and benefit from the embodiments described herein. In one embodiment, the switches 115, 120 in the Sites 1 and 2 can be used to facilitate communication between physical servers or data storage elements in two datacenters (e.g., a datacenter in the U.S. and a datacenter in Europe). In another example, the switches 115, 120 may also be deployed to facilitate communication in a physical or virtual cloud. For example, Sites 1 and 2 may be different regions of the same cloud infrastructure.

Both Site 1 and Site 2 include a local-site controller 135 that establishes a namespace for the sites. In one embodiment, local-site controllers 135 (which can be implemented using software, hardware, or combinations thereof) can set up the namespaces independently from the namespaces in the other sites. Put differently, the namespaces in the sites are private. As a result, the namespace in Site 1 and the namespace in Site 2 may conflict or overlap. For example, when assigning values to the BDs in Site 1, the local-site controller 135A can use the same IP address that the local-site controller 135B assigns to a BD in Site 2. For instance, the same set of IP addresses, software security indexes, or network segment indexes can be re-used by the local-site controllers 135 when establishing their private namespaces. This becomes a problem when the host 125A and applications 130A in Site 1 attempt to send packets to the host 125B and applications 130B in Site 2 since the source identifiers (e.g., the IP address for the VRF instance, BD, or subnet, and the Class ID for the EPGs) in the packets can be assigned to multiple entities (e.g., a BD in Site 2 may have the same IP address as a BD in Site 1). As discussed in detail below, a multi-site controller 140 (which can be software, hardware, or combinations thereof) provides namespace translation mappings that permit each site to translate the namespace specific information in a received packet to a corresponding value in its own namespace. In this manner, the sites can have private namespaces that conflict and still permit the hosts 125 and applications 130 in different sites to communicate using Layer 2 traffic.

In FIG. 1, the unified fabric 100 uses a public network 105 (e.g., the Internet) to facilitate traffic flow between the fabrics of Site 1 and Site 2 which may be located large distances from each other. The sites can use VXLANs 110 to transmit data into the public network 105 which then routes the data to one of the spine switches 115 in the other site where the packet is routed to the leaf switch 120 coupled to the destination host 125 or application 130. Although FIG. 1 illustrates two sites, the unified fabric 100 can include any number of sites that each has its own independent fabric and namespace.

The multi-site controller 140 communicates with the local-site controllers 135 in each of the sites. The multi-site controller 140 can use the local-site controllers 135 to identify the namespaces, provide the namespace translation mappings, change the EPG assignments of the hosts 125 and applications 130, establish security contracts between the EPGs, and the like. To receive instructions from a system administrator, the multi-site controller 140 is coupled to an API 145 and GUI 150. Using one or both of these components, the system administrator can establish security policies and perform workload deployment across the different fabrics without having to individually configure each site in the fabric 100. Instead, the multi-site controller 140 receives the request from the system administrator and can use the embodiments described below to carry out the request by communicating with the local-site controllers 135. Thus, to the perspective of the system administrator, the API 145 and GUI 150 provide a "single pane of glass" that can be used to control the sites as a whole.

Figure 2:
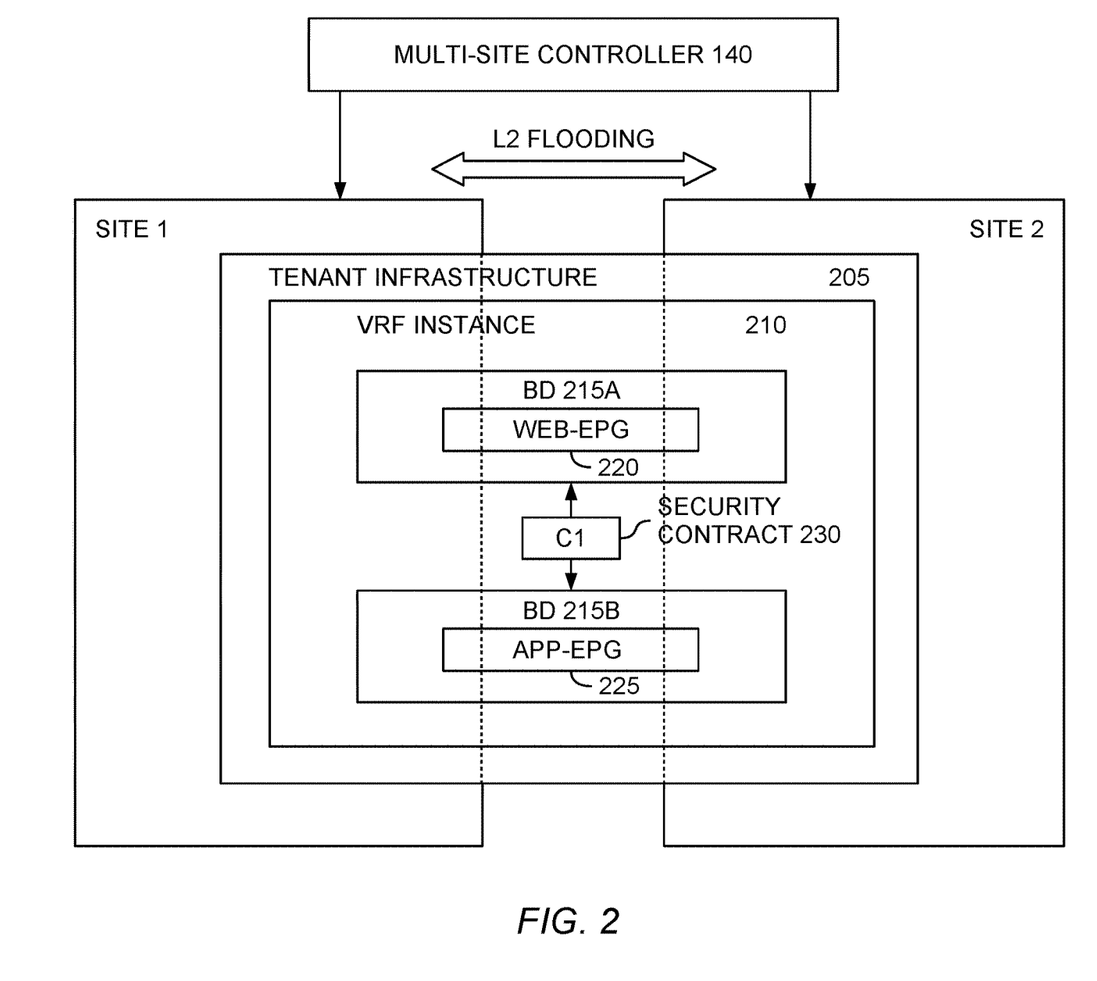
FIG. 2 illustrates a unified fabric including endpoint groups stretched between sites, according to one embodiment described herein.

FIG. 2 illustrates a unified fabric including EPGs stretched between sites, according to one embodiment described herein. FIG. 2 illustrates stretching the Web-EPG 220 and the App-EPG 225 to include both Site 1 and Site 2. Thus, host and applications in the different sites can now be assigned to the same EPG where previously a host or site could only be assigned to an EPG in the particular site. Using the deployment in FIG. 2, a service can use hosts and applications on different sites. For example, the Web-EPG can use hosts and applications in both sites to perform a service—e.g., establish a web server. Thus, a portion of the service can be performed by endpoints at Site 1 while other portions of the service are performed by endpoints at Site 2.

In one embodiment, the multi-site controller 140 configures the sites so that there is uniform availability of VRF, BD (or subnet), and EPG across the sites. In order to achieve uniform availability, the multi-site controller 140 creates config objects such as namespace translation mappings that permit the hosts and applications at different sites but that are in the same EPG to communicate.

As shown, a tenant infrastructure 205 is stretched across the sites. The tenant infrastructure 205 can be a logical container for application policies or shared resource requirements. For example, each customer that uses the underlying datacenter or cloud can have their own tenant infrastructure that establishes their desired policies. As such, the unified fabric can include multiple tenant infrastructures 205.

The tenant infrastructure 205 includes a VRF instance 210 (or a VRF object) that is a Layer 3 forwarding and application policy domain which defines a L3 address domain. Although one VRF instance 210 is shown, the tenant infrastructure 205 can include any number of VRF instances 210.

The VRF instance 210 includes BD 215A and BD 215B which each may be associated with one or more subnets. The BDs 215 define a Layer 2 MAC address space and Layer 2 flood domain if such flooding is enabled. In one embodiment, while the VRF instance 210 defines a unique IP address space, that address space can include multiple subnets which are referenced in the BDs 215. In this example, each of the EPGs is assigned to one of the BDs 215—i.e., the Web-EPG 220 is in the BD 215A while the App-EPG 225 is in the BD 215B.

In FIG. 2, the multi-site controller 140 has established a security contract 230 (labeled C1) between the Web-EPG and the App-EPG. This permits the underlying resources or endpoints in the datacenter or cloud infrastructure assigned to the Web-EPG and App-EPG to communicate via the unified fabric. For example, the endpoints in the Web-EPG can establish a web server while the endpoints in the App-EPG establish a database. Because of the security contract 230, the endpoints assigned to the Web-EPG can communicate with the endpoints in the App-EPG using the unified fabric, and vice versa. Thus, the VRF instance 210 permits a host or application in Site 1 to communicate with a host or application in Site 2 if these entities are assigned to the same EPG or if the entities are assigned to different EPGs (either the Web-EPG or the APP-EPG). However, if the security contract 230 was not there, only the endpoints assigned to the same EPG would be able to communicate with each other, regardless whether those endpoints were in the same site or different sites.

Figure 3:
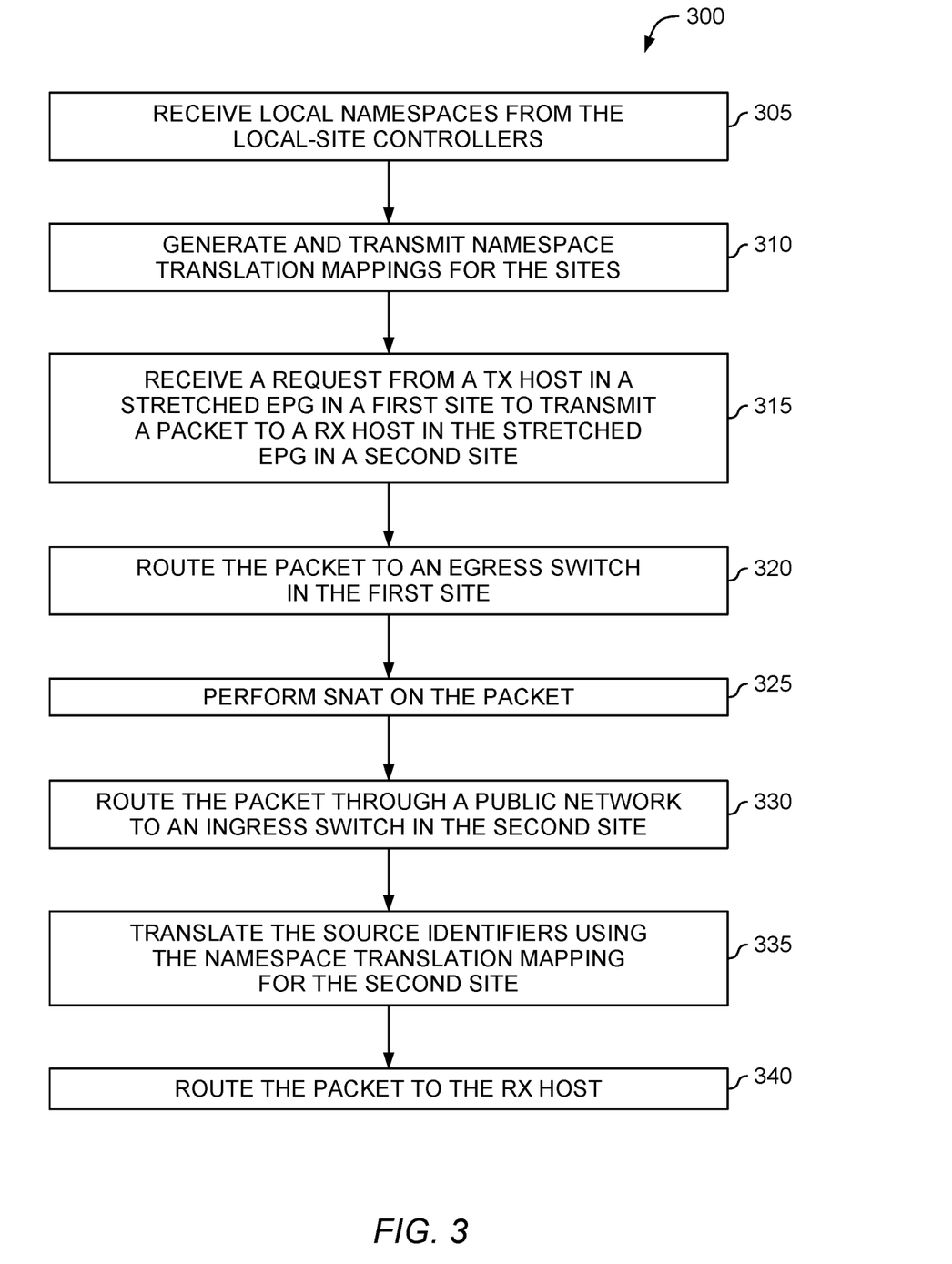
FIG. 3 is a flowchart for communicating between hosts at different sites belonging to the same endpoint group, according to one embodiment described herein.

FIG. 3 is a flowchart of a method 300 for communicating between hosts belonging to the same endpoint group but different sites, according to one embodiment described herein. At block 305, the multi-site controller receives local namespaces from the local-site controllers. That is, in response to a request (e.g., a config push action) from the multi-site controller or at predefined events (e.g., when the namespace is first established or when the namespace is updated), the local-site controllers transmit the namespace assignments to the multi-site controller. That is, the local-site controllers can be polled by the multi-site controller. As mentioned above, the local-site controllers may use the same range of values (e.g., the same range of IP addresses, security indexes, or network segment indexes) when establishing their respective namespaces. As such, the values may conflict—i.e., the same value may be used to name objects in multiple sites. For example, the same IP address may be assigned to a BD in Site 1 and a BD in Site 2. These conflicts, if not resolved, can cause errors when routing packets or applying security policies between the sites in the unified fabric.

At block 310, the multi-site controller generates and transmits namespace translation mappings for the sites. That is, the multi-site controller uses the namespace values received from the local-site controller to effectively stretch the EPGs (and the BDs, VRF instances, and tenant infrastructure) across two or more of the sites. For example, referring to the example in FIG. 2, the local-site controller for Site 1 may have named the VRF instance 210 VRF VNID X (where VNID is a source identifier) but the local-site controller for Site 2 may have named its VRF instance 210 VRF VNID A. Because these two separate objects should be stretched and treated as the same VRF instance 210, the multi-site controller provides a namespace translation mapping for Site 1 that indicates a received packet that has VRF VNID A should be translated to VRF VNID X. The multi-site controller also provides a namespace translation mapping for Site 2 that indicates a received packet that has a VRF VNID X should be translated to VRF VNID A. In this manner, the different (and potentially conflicting) namespace values used by Site 1 and Site 2 can be reconciled so that the VRF instances in the two sites are effectively a single stretched VRF instance 210 as shown in FIG. 2.

The multi-site controller can use a similar process to establish the namespace translation mapping for the other objects in the sites such as the BDs and EPGs. For example, the local-site controller in Site 1 may assign the Web-EPG 220 in FIG. 2 a Class ID of "Z" but the local-site controller in Site 2 assigns the Web-EPG 220 a Class ID of "C". In response, the multi-site controller can provide a namespace translation mapping for Site 1 that any packet received from Site 2 with a Class ID of C should be translated to Z and for Site 2 that any packet received from Site 1 with a Class ID of Z should be translated to C. In this manner, the multi-site controller can provide a namespace translation mapping so that depending on the site that transmitted the packet, the receiving site can convert the Class ID in that packet to a corresponding Class ID (assuming the EPG is stretched between the two sites).

The multi-site controller can use a similar process to generate namespace translation mappings to convert between BD source identifiers used by the various sites when a BD is stretched between the sites. For example, the BD VNID for the BD 215A in FIG. 2 may be assigned a value of "Y" by Site 1 but a value of "B" by Site 2.

Figure 4:
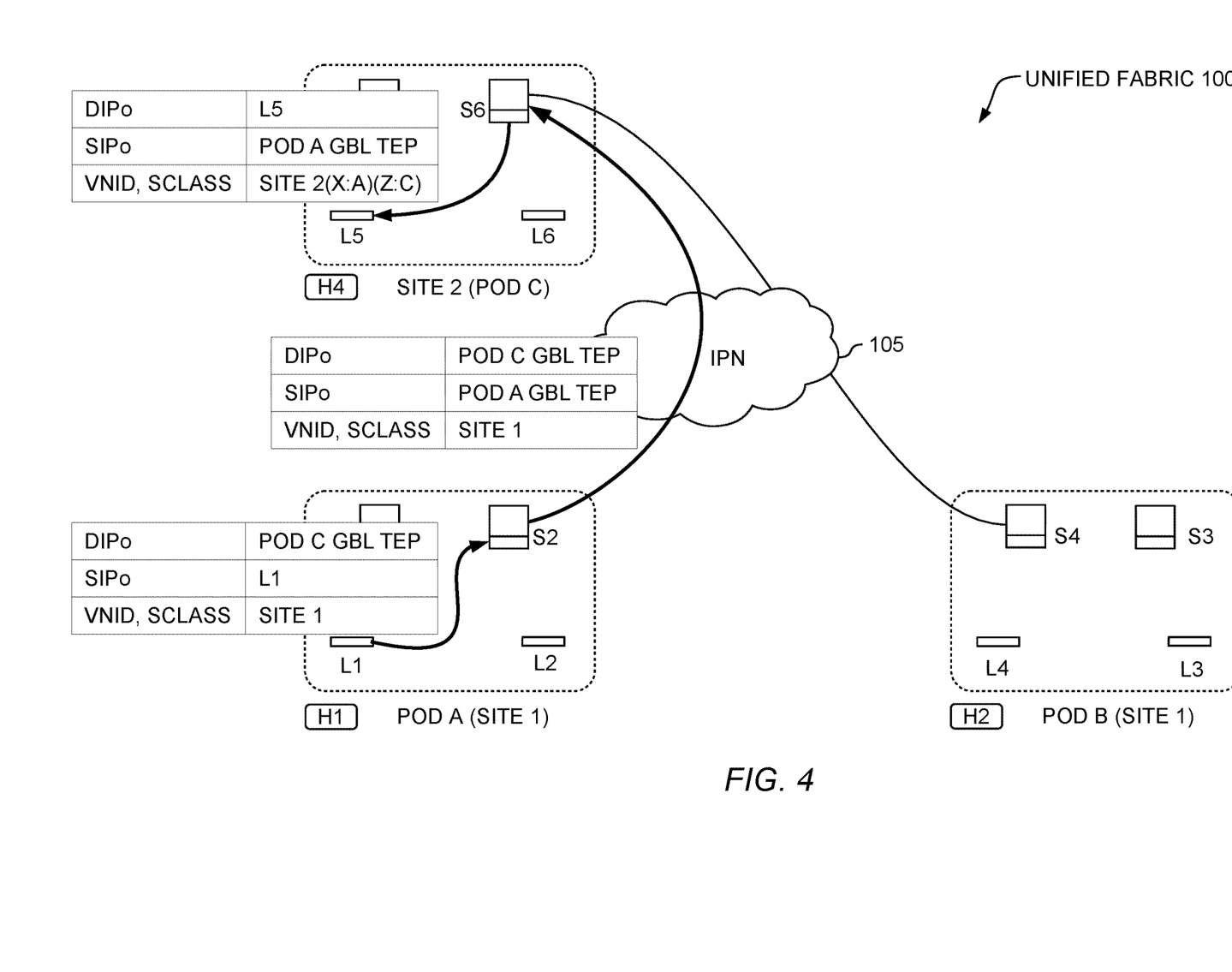
FIG. 4 illustrates a unified fabric including multiple sites, according to one embodiment described herein.

At block 315, a leaf switch in a first site receives a request from a transmitting host (e.g., a TX host) assigned to a stretched EPG to transmit a packet to a receiving host (e.g., a RX host) in a second site also assigned to the stretched EPG. For clarity, the blocks in the method 300 are discussed in tandem with FIG. 4 which illustrates a unified fabric 100 that includes multiple sites, according to one embodiment described herein. In FIG. 4, a Host H1 (e.g., the TX host) provides a packet to Leaf Switch L1 in Site 1 which should be routed to a Host H4 in Site 2. Moreover, FIG. 4 illustrates that each site can have multiple pods—e.g., Pod A and Pod B—which each include different groups of spine and leaf switches, but this is not a requirement.

At block 320, the leaf switch L1 routes the packet to an egress switch in the first site. For example, each site may have one or more designated spine switches for transmitting and receiving inter-site traffic. For example, the spine switch S2 may be the designated switch for transmitting traffic to other sites in the unified fabric 100. However, in other embodiments, any of the spine switches can transmit inter-site traffic.

At block 325, the spine switch S2 performs source network address translation (SNAT) on the packet. For example, the spine switch S2 can identify, based on the destination information in the packet, that the packet should be routed to Site 2. In response, the spine switch performs SNAT to a global tunnel endpoint (TEP) that is known to the public network 105 so that the network 105 can route the packet to Site 2. In one embodiment, each site in the fabric 100 includes at least one public IP address so that the site can receive the inter-site traffic via the public network 105.

At block 330, the public network 105 routes the packet to an ingress switch in the second site—e.g., the spine switch S6. In one embodiment, the public network 105 routes the packet using destination information added by either leaf switch L1 or spine switch S2 in case the leaf switch L1 is not aware of host H4 site Global TEP.

At block 335, the spine switch S6 translates the source identifiers (e.g., VNIDs and Class IDs) using the namespace translation mapping for the second site which was provided by the multi-site controller at block 310. That is, the spine switch S6 converts the values of the source identifiers in the packet corresponding to the private namespace of Site 1 to the values of those same source identifiers in the private namespace of Site 2. Using the examples above, the VNID of the VRF may be converted from X to A, the VIND of the BD from Y to B, and the Class ID of the EPG from Z to C. Because the packet is part of a VRF, BD, and EPG that are stretched between Site 1 and Site 2, the spine switch S6 uses the namespace translation mapping to convert source identifiers of the VRF, BD, and EPG to the values used in the namespace of Site 2 from the source identifiers used in the namespace of Site 1. In this manner, the namespace translation mappings enable the unified fabric 100 to stretch the VRF, BD, and EPG between multiple sites as illustrated in FIG. 2.

At block 340, the spine switch S6 uses the new source identifier values in the packet to route the packet to the RX host—e.g., Host H4—via the leaf switch L5 by, for example, performing a DNAT at spine switch S6 to leaf switch L5's private TEP IP. Thus, to the perspective of the leaf switch L5 and the RX host, the packet appears to have originated from an object (e.g., a host or application) in Site 2 rather than Site 1 since the source identifiers have been change to values defined by the namespace of Site 2.

Figure 5:
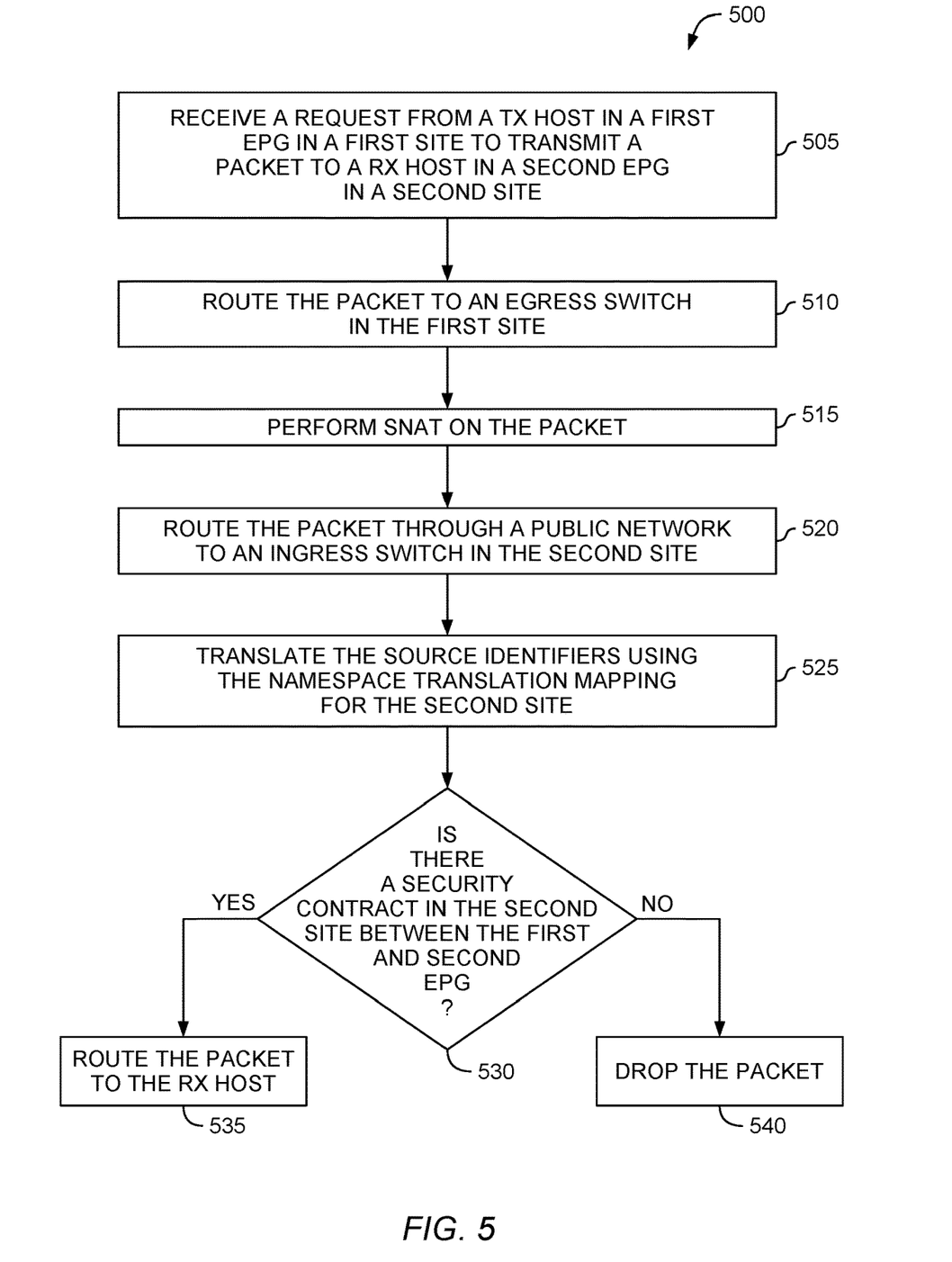
FIG. 5 is a flowchart for communicating between hosts belonging to different endpoint groups and different sites, according to one embodiment described herein.

FIG. 5 is a flowchart of a method 500 for communicating between hosts belonging to different endpoint groups and different sites, according to one embodiment described herein. At block 505, rather than transmitting a packet between two hosts in two different sites that are assigned to the same stretched EPG (like in method 300), the leaf switch L1 receives a request from a TX host (e.g., Host H1) in a first EPG at Site 1 to transmit a packet to a RX host (e.g., Host H4) in a second, different EPG in Site 2. For example, referring to FIG. 2, the TX Host H1 may be assigned to Web-EPG 220 while the RX Host H4 is assigned to App-EPG 225.

The blocks 510-525 are the same as the corresponding blocks 320-335 in method 300, and thus, are not described in detail here.

Once, at block 525, the spine switch S6 translates the source identifiers in the packet to the source identifiers defined by the namespace in Site 2, at block 530, the spine switch S6 determines whether there is a security contract at Site 2 between the first and second EPGs. That is, in one embodiment, Site 2 first converts the source identifiers in the received packet to source identifiers defined by its namespace and then determines, using those source identifiers, whether the packet (which is assigned to a first namespace) can be sent to a host or application assigned to a different EPG. Referring to the example in FIG. 2, there is a security contract 230 between the Web-EPG and the App-EPG. Thus, if Hosts H1 and H4 are both assigned to one of these EPGs, this means they can communicate with each other.

In one embodiment, the spine switch S6 uses the new source identifiers to determine whether the security contract is satisfied and the hosts assigned to two different EPGs can communicate. For example, if the spine switch S6 tried to use the original source identifiers in the received packet (which was defined by the namespace of Site 1), the security contract would not have been satisfied, and at block 540 the spine switch S6 would drop the packet, or at a minimum, not route the packet to its destination. However, if the spine switch S6 determines there is a security contract between the two stretched EPGs, at block 535, the switch S6 routes the packet to the leaf switch L5 and to the Host H4. Like in method 300, to the perspective of the leaf switch L5 and the RX host, the packet appears to have originated from an object (e.g., a host or application) in Site 2 rather than Site 1 since the source identifiers have been change to the values matching the namespace of Site 2.

Thus, using method 500, objects in two different sites assigned to two different stretched or unstretched EPGs can communicate using security contracts assigned to those sites. In one embodiment, when the user instructs the multi-site controller to establish the two stretched EPGs and ensure that the objects assigned to those EPGs can communicate with each other, the multi-site controller can establish security contracts in both of the sites indicating the EPGs can communicate. These contracts may be established at the same time the multi-site controller transmits the namespace translation mappings to the sites.

Figure 6:
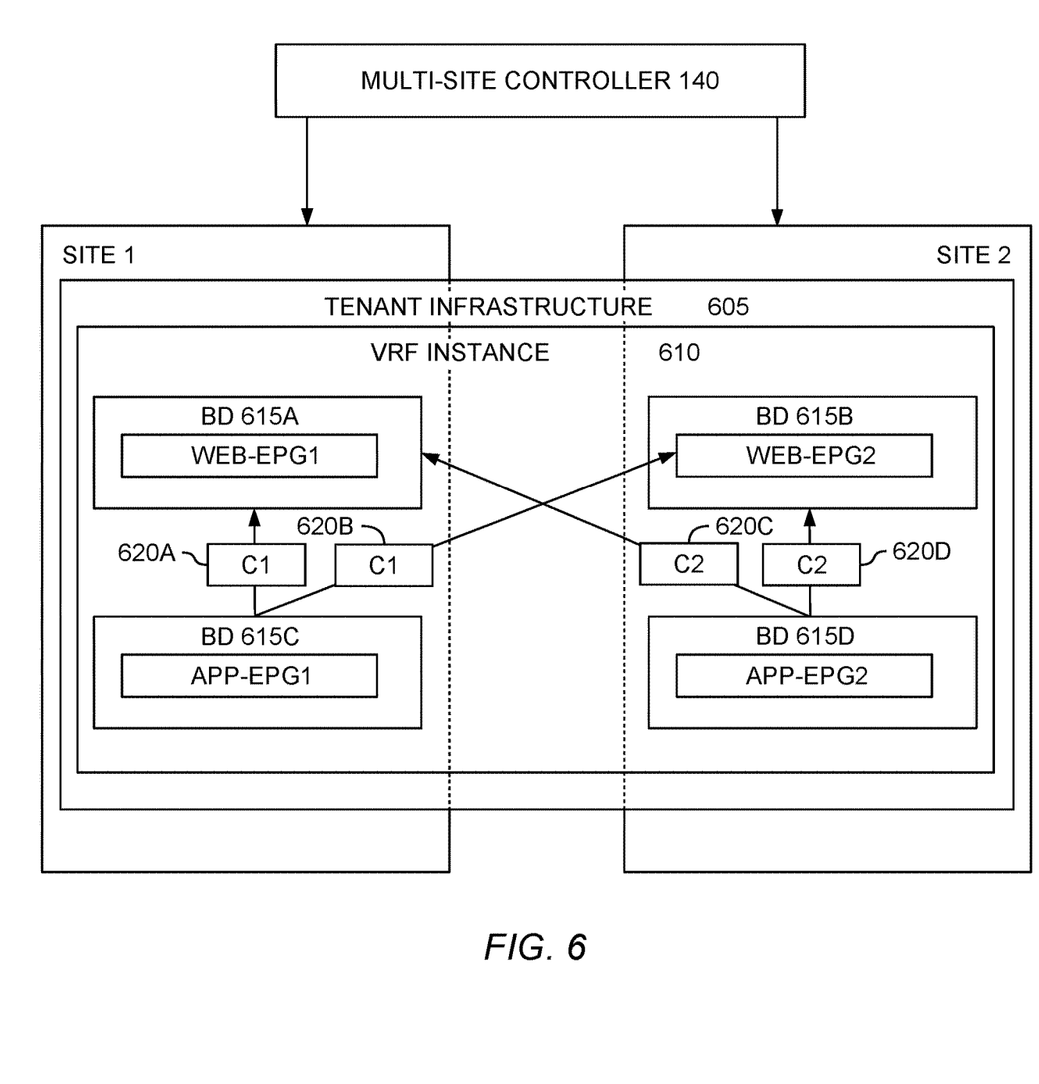
FIG. 6 illustrates a unified fabric that has security policies to permit endpoint groups in different sites to communicate, according to one embodiment described herein.

FIG. 6 illustrates a unified fabric that has security policies that permit EPGs in different sites to communicate, according to one embodiment described herein. The unified fabric includes Site 1 and Site 2 which share the same tenant infrastructure 605 and VRF instance 610. However, unlike in FIG. 2, the EPGs are in separate BDs 615. That is, the Web-EPG1 is in the BD 615A, the Web-EPG2 is in the BD 615B, the App-EPG1 is in the BD 615C, and the App-EPG2 is in the BD 615D.

In response to a request from a system administrator, the multi-site controller 140 establishes security contracts 620 between the EPGs so that the EPGs can rely on each other to perform a service. For example, the Web-EPG1 and Web-EPG2 may provide website services which rely on database applications performed by the objects assigned to App-EPG1 and App-EPG2. As such, the multi-site controller 140 establishes the security contract 620A (labeled C1) between the Web-EPG1 and the App-EPG1 and the security contract 620D (labeled C2) between the Web-EPG2 and the App-EPG2 which permit the objects assigned to these EPGs to communicate.

To improve redundancy (e.g., in case of a disaster), the multi-site controller also establishes security contracts between EPGs in the different sites. That is, the security contract 620B permits the Web-EPG2 in Site 2 to communicate with the App-EPG1 in Site 1. Further, the security contract 620C permits the Web-EPG1 in Site 1 to communicate with the App-EPG2 in Site 2. During normal operation, the hosts in the WebEPGs and the App-EPGs may communicate with EPGs in the same site since this avoids the added latency of transmitting packets across the public network. However, if one of the EPG fails, the still functioning EPG at that site may rely on the EPG in the other site to continue to provide the desired service to customers. For example, if App-EPG1 fails, Web-EPG1 can use the host and applications in Site 2 assigned to App-EPG2 to perform the service that normally would be performed by the hosts and applications assigned to App-EPG1. In this manner, if any one of the EPGs in FIG. 6 fails, the security contracts 620 provide policies so that a backup EPG can be used.

Unlike in FIG. 2 where the EPGs are stretched between the sites, in FIG. 6, the EPGs are not, and thus, a host or application in Web-EPG1 cannot communicate with the hosts and applications in Web-EPG2. The same goes for the host and applications in App-EPG1 and App-EPG2. However, because of the contracts 620, the hosts and applications in the Web-EPG1 and Web-EPG2 can communicate with the hosts and applications in either of the App-EPGs, and vice versa.

Although FIG. 6 illustrates two sites, additional redundancy can be added with the addition of a third site. By adding contracts between the Web-EPGs and the App-EPGs in all three sites, if any one EPG fails, its work can be distributed across two different sites (or sent to the EPG on the site that is least busy). As such, the principles described herein can be expanded to a unified fabric with any number of sites. Moreover, while FIG. 6 is described for redundancy, the embodiments herein can also be used for load balancing. For example, assuming all the EPGs in FIG. 6 are functional, if the App-EPG1 becomes overworked, the Web-EPG1 may begin to offload some of its traffic to Site 2 and the App-EPG2, thereby distributing its workload across the unified fabric.

Figure 7:
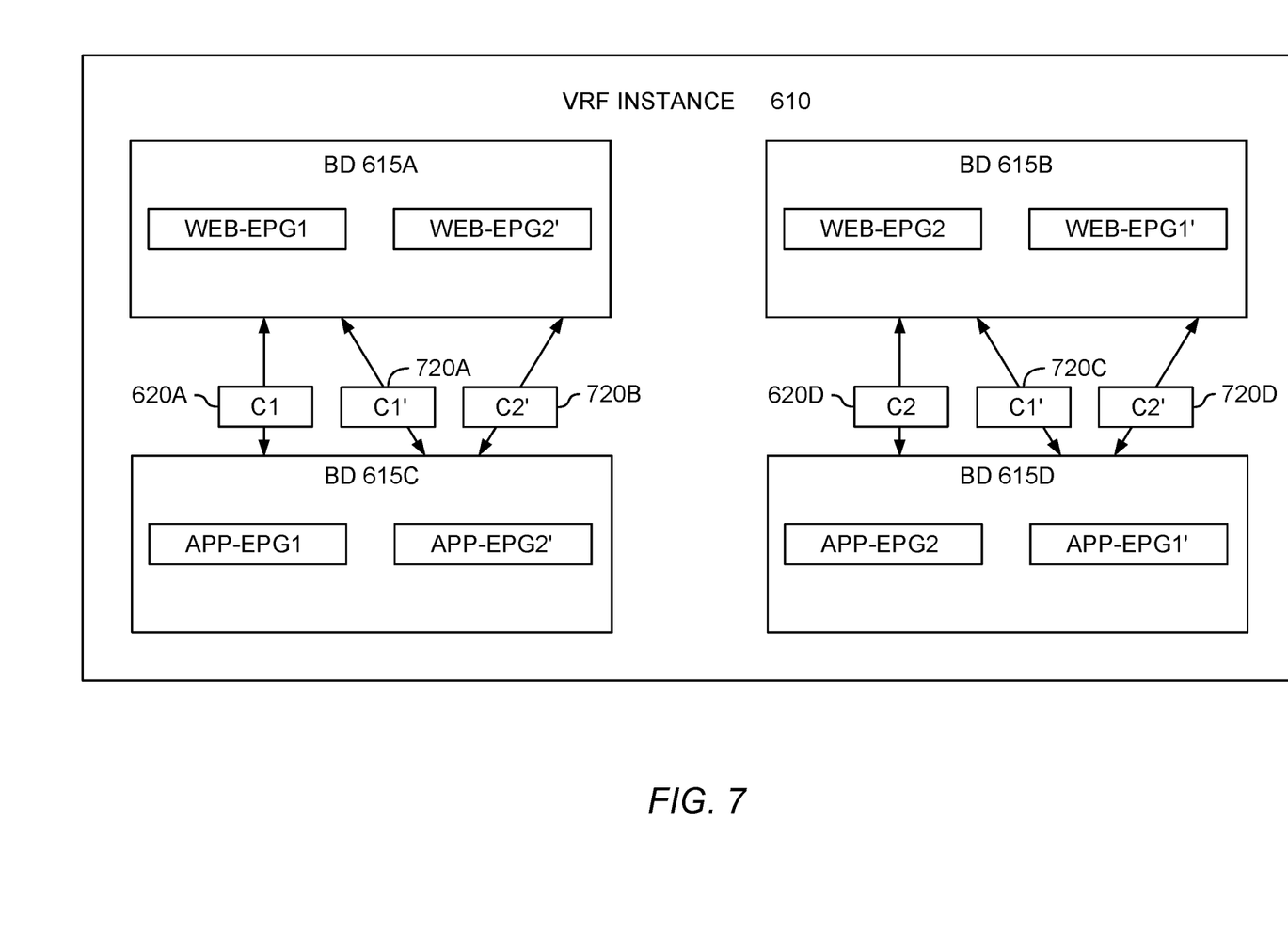
FIG. 7 illustrates establishing shadow endpoint groups to permit endpoint groups in different sites to communicate, according to one embodiment described herein.

FIG. 7 illustrates establishing shadow EPGs to permit real EPGs in different sites to communicate, according to one embodiment described herein. While FIG. 6 illustrates a high-level logical view of the unified fabric (which might be presented to the system administrator), FIG. 7 illustrates the technical changes the multi-site controller can perform to ensure that an EPG on one site can be used as a backup (or to perform loading balancing) for an EPG in another site.

FIG. 7 illustrates a more detailed view of the VRF instance 610 in FIG. 6. In this example, the multi-site controller instructs the local-site controllers for Site 1 and Site 2 to generate shadow EPGs. In one embodiment, the shadow EPGs are an intermediary which represent a security contract between EPGs in two different sites. Shadow EPGs are useful since the sites do not need to have knowledge about remote objects (e.g., EPGs) in other sites. That is, Site 1 does not need to know what EPGs are in Site 2 and vice versa. Instead, the multi-site controller can establish the shadow EPGs to stand as proxies or intermediaries for EPGs in other sites. As discussed below, the multi-site controller can establish security contracts between the shadow and real EPGs in the sites.

In this case, because both of the Web-EPGs in the sites have security contracts with both of the App-EPGs in the sites, the multi-site controller establishes a Web-EPG2' (where ' indicates that the EPG is a shadow EPG) in Site 1, a Web-EPG1' in Site 2, an App-EPG2' in Site 1, and an App-EPG1' in Site 2. In addition, the local-site controllers establish additional security contracts 720 between the shadow EPGs and the real EPGs at each site. These security contracts represent the security contracts 620B and 620C in FIG. 6 which extend between EPGs in different sites. Specifically, the security contract 620B in FIG. 6 is represented in FIG. 7 by the security contract 720B between the real App-EPG1 and the shadow Web-EPG2' and the security contract 720C between the shadow App-EPG1' and real Web-EPG2. The security contract 620C in FIG. 6 is represented in FIG. 7 by the security contract 720A between the real Web-EPG1 and the shadow App-EPG2' and the security contract 720D between the real App-EPG2 and the shadow Web-EPG1'. As discussed below, the security contracts 720 in the respective sites between the real and shadow EPGs permit the EPGs in different sites to communicate with each other.

Figure 8:
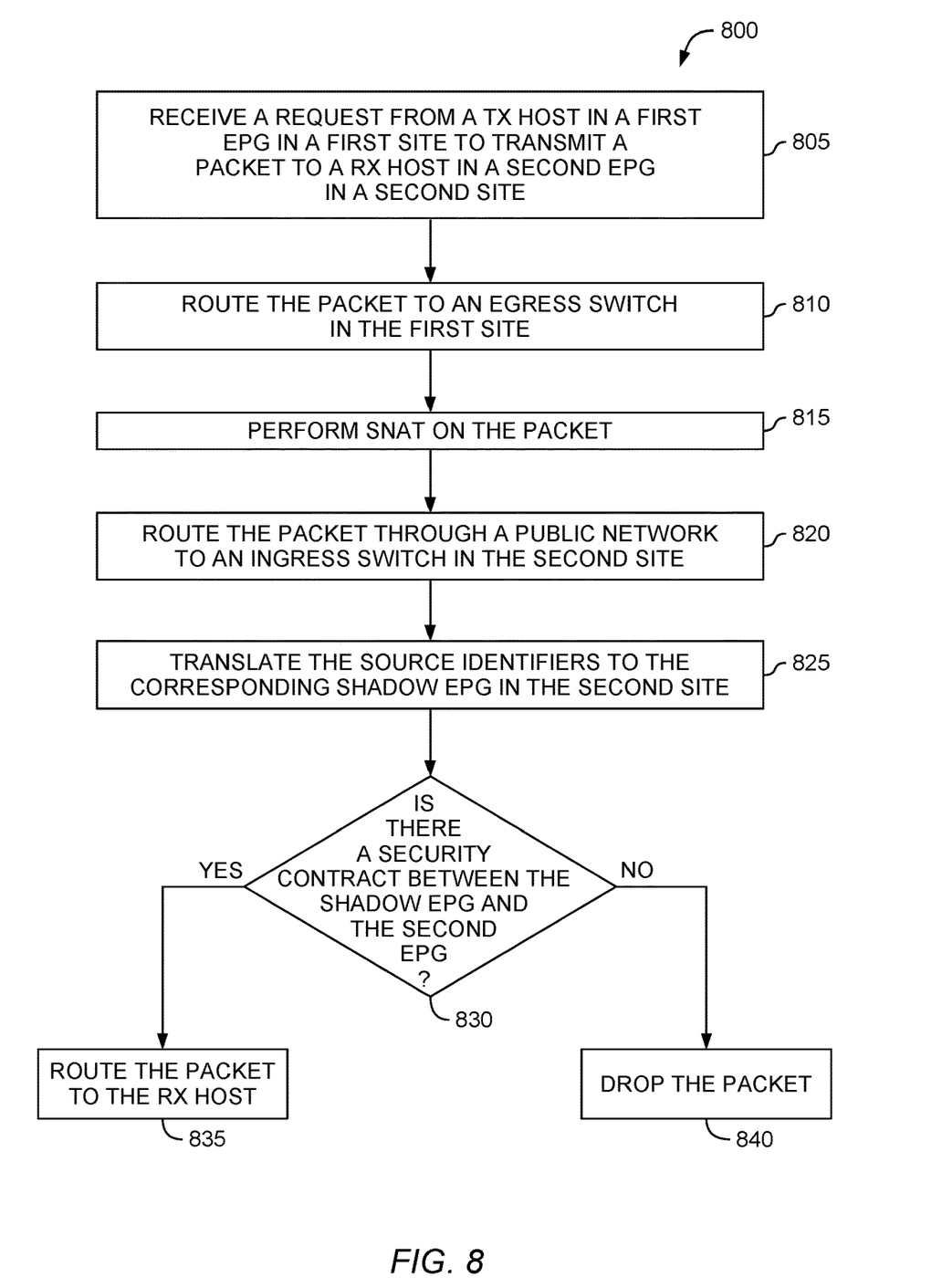
FIG. 8 is a flowchart for communicating between endpoint groups in different sites using shadow endpoint groups, according to one embodiment described herein.

FIG. 8 is a flowchart of a method 800 for communicating between EPGs in different sites using shadow EPGs, according to one embodiment described herein. For clarity, the method 800 is discussed in tandem with the unified fabric in FIG. 7 and the example packet transmission illustrated in FIG. 4.

The blocks 805-820 of method 800 correspond to the blocks 505-520 in FIG. 5 where Host H1 in Site 1 that is assigned to a first EPG (e.g., Web-EPG1) transmits a packet to Host H4 in Site 2 that is assigned to a second EPG (e.g., App-EPG2), and thus, are not described in detail here. In one embodiment, the method 800 begins when a local EPG has failed (e.g., the App-EPG1 at Site 1 fails forcing the host assigned to the Web-EPG1 to transmit traffic to the App-EPG2 at Site 2). In another embodiment, the method 800 is performed as part of load balancing so that the hosts assigned to the Web-EPG1 transmit data to both the local App-EPG1 at Site 1 and the external App-EPG2 at Site 2.

At block 825, the spine switch S6 translates the source identifiers in the received packet to the corresponding shadow EPG in the second site. That is, in contrast to method 300 and 500 where the EPG was stretched between the sites, in the method 800, the EPGs are not. As such, the spine switch S6 changes the source identifiers in the packet from the values defined by the namespace in Site 1 to the values assigned to the shadow EPG by the namespace in Site 2. Assuming Host H1 is assigned to Web-EPG1 and has a Class ID of "Z" and the shadow Web-EPG1' in Site 2 has a Class ID of "O", the spine switch S6 translates the source identifier in the packet from Z to O. Now, to the perspective of the other components in Site 2, the packet appears to have originated from the shadow Web-EPG1'. In addition to updating the source identifier for the EPG, the spine switch S6 can also update the source identifiers for the BD and VRF as discussed above.

Thus, at block 825, the spine switch S6 checks whether there exists a namespace translation mapping that the switch S6 can use to convert the source identifier for the EPG in Site 1 into a source identifier for a shadow EPG in Site 2. If not, this may indicate there is no security contract between the EPG in Site 1 and the local EPG in Site 2, and thus, at block 840, the spine switch S6 drops the packet. Put differently, if the multi-site controller does not provide a namespace translation mapping for the source identifier in the packet from Site 1, this indicates that there is not a corresponding shadow EPG at Site 2, and the spine switch should not forward the packet to its destination.

However, if there is a namespace translation mapping for the source identifier in the received packet and a shadow EPG, this indicates there is a contract between the two EPGs and the spine switch S6 replaces the source identifier in the packet with the source identifier (e.g., a Class ID) for the shadow EPG. At block 835, the switching fabric in S2 routes the packet (which now includes the source identifier of the shadow EPG) to the RX host.

Providing the shadow EPG enables Site 2 to have a security contract indicating that data traffic assigned to the shadow EPG can communicate with hosts or applications assigned to a real EPG. For example, referring to FIG. 7, traffic received from the Web-EPG1 in Site 1 is first converted to Web-EPG1' at Site 2. The contract 720D provides permission for the Site 2 to route the packet (which is assigned to Web-EPG1') to a destination assigned to App-EPG2. In this manner, traffic originating from a host assigned to Web-EPG1 on Site 1 can reach a host assigned to App-EPG2 on Site 2. This is also shown logically by the contract 620C in FIG. 6.

Using the method 800, the multi-site controller can establish shadow EPGs which serve as intermediaries between EPGs in different sites and establish a security contract between the EPGs. Put differently, the shadow EPGs are proxies for EPGs in a different site so that access policies can be established between EPGs are the same site. Because of the shadow EPGs, the individual sites do not need knowledge of the objects in the other sites or their configuration. When packets are received, the source identifiers are converted to the source identifier of the corresponding shadow EPG in the namespace of the site. The packets are then routed through the fabric to the destination host or application which is assigned to a different EPG. That is, the receive site has a security contract indicating that a packet assigned to the shadow EPG is permitted to communicate with the EPG assigned to the destination host.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer programs products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
a multi-site controller communicably connected to a first datacenter at a first location and a second datacenter at a second location, the first and second datacenter connected through a public network;
wherein the first datacenter includes a first local site controller for a first namespace in the first datacenter, and a first application running in the first namespace;
wherein the second datacenter includes a second local site controller for a second namespace in the second datacenter, and a second application running in the second namespace;
wherein the first application includes a first plurality of network-addressable entities, including a first entity that can communicate within the first namespace;
wherein the second application includes a second plurality of network-addressable entities, including a second entity that can communicate within the second namespace;
wherein the multi-site controller comprises non-transitory computer-readable media containing instructions, which when executed cause the multi-site controller to perform operations including:
connecting to the first local site controller and connecting to the second local site controller;
establishing a mapping between the first entity within the first namespace and the second entity within the second namespace; and
enabling communication between the first entity and the second entity in accordance with the mapping.

2. The system of claim 1, wherein the first local site controller allows network traffic between entities in the first namespace according to a first local security policy;
wherein the second local site controller allows network traffic between entities in the second namespace according to a second local security policy; and
wherein the multi-site controller uses a multi-site security policy to enable communications between the first entity and the second entity.

3. The system of claim 1, wherein the first namespace includes a first network addressable proxy for the second entity within the first namespace; and
wherein the second namespace includes a second network addressable proxy for the first entity within the second namespace.

4. The system of claim 1, wherein the first application in the first namespace and the second application in the second namespace are the same application.

5. The system of claim 1, wherein the first application in the first namespace and the second application in the second namespace are different applications.

6. The system of claim 1, wherein the first datacenter is in a first cloud and the second datacenter is in a second cloud.

7. The system of claim 1, wherein the first datacenter is in a first region of a cloud and the second datacenter is in a second region of the cloud.

8. The system of claim 1, wherein the second entity is a service.

9. The system of claim 1, wherein the second entity is a host.

10. A method comprising:
at a multi-site controller communicably connected to a first datacenter at a first location and a second datacenter at a second location, the first and second datacenter connected through a public network;
wherein the first datacenter includes a first local site controller for a first namespace in the first datacenter, and a first application running in the first namespace, and wherein the second datacenter includes a second local site controller for a second namespace in the second datacenter, and a second application running in the second namespace;
wherein the first application includes a first plurality of network-addressable entities, including a first entity that can communicate within the first namespace and wherein the second application includes a second plurality of network-addressable entities, including a second entity that can communicate within the second namespace;

connecting to the first local site controller and connecting to the second local site controller;

establishing a mapping between the first entity within the first namespace and the second entity within the second namespace; and enabling communication between the first entity and the second entity in accordance with the mapping.

11. The method of claim 10, further comprising allowing network traffic between entities in the first namespace according to a first local security policy;

allowing network traffic between entities in the second namespace according to a second local security policy; and using a multi-site security policy to enable communications between the first entity and the second entity.

12. The method of claim 10, wherein the first application in the first namespace and the second application in the second namespace are the same application.

13. The method of claim 10, wherein the first application in the first namespace and the second application in the second namespace are different applications.

14. The method of claim 10, wherein the first datacenter is in a first cloud and the second datacenter is in a second cloud.

15. The method of claim 10, wherein the first datacenter is in a first region of a cloud and the second datacenter is in a second region of the cloud.

16. The method of claim 10, wherein the second entity is a service.

17. The method of claim 10, wherein the second entity is a host.

18. A non-transitory computer-readable media containing instructions, which when executed cause a multi-site controller to perform operations including:

connecting a multi-site controller to a first datacenter at a first location and a second datacenter at a second location, the first and second datacenter connected through a public network;

wherein the first datacenter includes a first local site controller for a first namespace in the first datacenter, and a first application running in the first namespace, and wherein the second datacenter includes a second local site controller for a second namespace in the second datacenter, and a second application running in the second namespace;

wherein the first application includes a first plurality of network-addressable entities, including a first entity that can communicate within the first namespace, and wherein the second application includes a second plurality of network-addressable entities, including a second entity that can communicate within the second namespace;

connecting to the first local site controller and connecting to the second local site controller;

establishing a mapping between the first entity within the first namespace and the second entity within the second namespace; and enabling communication between the first entity and the second entity in accordance with the mapping.

19. The instructions of claim 18, the operations further comprising allowing network traffic between entities in the first namespace according to a first local security policy;

allowing network traffic between entities in the second namespace according to a second local security policy; and using a multi-site security policy to enable communications between the first entity and the second entity.

20. The instructions of claim 18, wherein the first application in the first namespace and the second application in the second namespace are the same application.

21. The instructions of claim 18, wherein the first application in the first namespace and the second application in the second namespace are different applications.

22. The instructions of claim 18, wherein the first datacenter is in a first cloud and the second datacenter is in a second cloud.

23. The instructions of claim 18, wherein the first datacenter is in a first region of a cloud and the second datacenter is in a second region of the cloud.

24. The instructions of claim 18, wherein the second entity is a service.

25. The instructions of claim 18, wherein the second entity is a host.

* * * * *